United States Patent [19]
Guenthner

[11] 3,950,494
[45] Apr. 13, 1976

[54] SUPPRESSION OF VOLATILIZATION OF NOXIOUS ACIDIC VAPORS

[75] Inventor: Richard A. Guenthner, Birchwood Village, Minn.

[73] Assignee: Minnesota Mining and Manufacturing Company, St. Paul, Minn.

[22] Filed: June 25, 1974

[21] Appl. No.: 483,054

[52] U.S. Cl............ 423/270; 21/60.5 A; 21/60.5 R; 252/385; 423/265
[51] Int. Cl.² ..................... B01J 1/18; C09K 3/00
[58] Field of Search .............................. 21/60.5 R; 169/43–47; 252/382, 385; 423/270, 265

[56] References Cited
UNITED STATES PATENTS 2,764,603  9/1956  Ahlbrecht .................. 21/60.5 R
2,797,141  6/1957  Veatch ....................... 21/60.5 R
3,146,060  8/1964  Canevari .................... 21/60.5 R Primary Examiner—Morris O. Wolk
Assistant Examiner—Dale Lovercheck
Attorney, Agent, or Firm—Alexander, Sell, Steldt & DeLaHunt

[57] ABSTRACT

A body of volatile, inorganic, normally liquid chemical which reacts with water, such as liquid sulfur trioxide, is treated to suppress the evolution of noxious acidic vapors therefrom to the atmosphere by applying to the exposed surface of said liquid body a treating agent consisting essentially of a fluorinated aliphatic liquid thickened with a thickening agent, such as fumed silica, to increase the viscosity thereof and render it relatively immobile and reduce the rate of flow of said vapors from said liquid body.

4 Claims, No Drawings

SUPPRESSION OF VOLATILIZATION OF NOXIOUS ACIDIC VAPORS

This invention relates to a composition and method for controlling the evolution or release of noxious vapors, such as sulfur trioxide, from a liquid body of volatile chemical, such as liquid sulfur trioxide, oleum, or the like.

There are a number of chemicals which in their liquid state will freely evolve noxious vapors at ambient temperature. When such liquids are spilled or leaked from a tank, pipeline, etc., due to an accident or improper handling, they give rise to potential or immediate hazards of toxicity, irritation, or corrosion. For example, when liquid sulfur trioxide or oleum is exposed to atmosphere under ambient conditions, they evolve sulfur trioxide vapor which upon reaction with the moisture in the atmosphere produces a fume in the form of a dense, white smoke of sulfuric acid which is injurious when inhaled or upon contact with mucous membrane. Liquid sulfur trioxide or oleum, like many other strongly acidic liquids, will violently or explosively react upon contact with water, and the use of water to remove accidental spills or leaks of such liquids is frequently precluded as a means of handling such hazards. Generally it is necessary to handle such hazards by evacuating people from the accident site and either allow the evolved noxious vapor to dissipate (which normally will require a long period of time) or attempt to minimize further evolution of noxious vapor by treating the spill or leak with some type of neutralizing agent. In any event, the existing methods of treating such hazards are far from being as effective as desired, particularly in view of the increasing concern for the protection of the environment.

Briefly, in one aspect of this invention, the evolution of noxious vapors from a liquid body of volatile chemical, such as liquid sulfur trioxide or oleum, is controlled by applying to the exposed surface thereof a treating agent comprising thickened fluorinated liquid which in the form of a substantially continuous layer on top of the body of chemical acts as a barrier or blanket restraining or suppressing the free release or evolution of the noxious vapors therefrom to the atmosphere, so as to facilitate the ready disposal of the body of chemical. The manner of handling spills and leaks of vapor-generating liquid chemicals in accordance with this invention is a marked and significant improvement over present procedures of handling or combatting the hazards arising from the noxious vapors evolved from such chemicals.

The treating agent used in practice of this invention comprises a fluorinated aliphatic liquid component and a finely divided, nonreactive inorganic solid thickening agent component having high surface area dispersed in the fluorinated liquid component. The amount of thickening agent added is that which will increase the viscosity of the fluorinated liquid and render it relatively immobile as a layer on the surface of the liquid body of chemical and reduce the rate of flow of the evolved noxious vapors through the layer of thickened fluorinated liquid, this amount of thickening agent yet being insufficient to impede the formation of the substantially continuous layer of thickened fluorinated liquid.

The fluorinated liquid used in this invention is a hydrophobic, highly fluorinated aliphatic material which is stable and inert with respect to the liquid body of chemical and noxious vapors thereof, and usually will be a mixture of compounds having such nature. The fluorinated aliphatic liquid can be straight chained, branched or cyclic or a combination thereof, such as alkylcycloalkyl. It can contain ethylenic unsaturation though it is preferably saturated. The skeletal chain of fluorinated liquid can include catenary oxygen and/or trivalent nitrogen hetero atoms bonded only to carbon atoms, such hetero atoms providing stable linkages between fluorinated groups and not interfering with the inert character of the fluorinated liquid. The fluorinated liquid can have from 6 to 100 or more carbon atoms, the maximum number of carbon atoms being dictated only by availability and the requirement that the fluorinated material remain liquid under conditions of use. Generally the fluorinated liquid will have a boiling point greater than about 55°C., preferably greater than about 75°C., and contain about 60 to 76 weight percent carbon-bonded fluorine. The fluroinated liquid can contain some hydrogen or chlorine, but preferably less than one half of the carbon-bonded, non-skeletal substituent atoms will be hydrogen or chlorine, the remainder being fluorine; more preferably, all such atoms are fluorine.

Fluorinated liquids useful in this invention are known and readily available, usually as mixtures of fluorinated liquids. U.S. Pat. Nos. 3,250,807, 3,250,808, and 3,274,239 disclose fluorinated oils, made by polymerization of perfluoropropylene oxide, which can be stabilized, e.g. as disclosed in U.S. Pat. Nos. 3,214,478, 3,242,218, and 3,342,875, to provide fluorinated liquids useful in this invention, said stabilization converting functional or active end groups to inert carbon-bonded hydrogen or fluorine by reaction with fluorinating agents, protic bases, or ultraviolet radiation. U.S. Pat. Nos. 2,500,388, 2,519,983, 2,594,272, and 2,616,927 and "Aliphatic Fluorine Compounds" by A. M. Lovelace et al., Reinhold Pub. Corp., N.Y. (1958), e.g. at pages 17–23, 76, 85 and 86, describe the preparation of inert, highly fluorinated compounds which are useful in this invention, such as hydrocarbons, ethers, and tertiary amines, said preparation involving electrochemical fluorination in anhydrous hydrogen fluoride medium. The inert, non-polar fluorocarbons disclosed in U.S. Pat. No. 3,792,977 and "Fluorine Chemistry" by J. H. Simons, Academic Press, N.Y. (1964), particularly Chapter 4, can be used as the fluorinated liquid component in this invention. Commercial fluorinated liquids useful in this invention are 3M Company's "Fluorinert" liquids, e.g. types FC-40, FC-43, FC-48, FC-75, FC-77, FC-78, and FC-86, described in that company's bulletins Y-ILBG(R)(87-1)RC and Y-IFC-48(60.2)R.

Another type of material which can be used as the fluorinated liquid component of the treating compositions of this invention is chlorofluorinated liquids, e.g. the halogen-containing telomers described in U.S. Pat. No. 2,770,659. Fluorinated liquids of this type are commercially available as "Halocarbon" liquids, e.g. grades 0.8/100 and 1.84/100, having boiling points of 136°C and 206°C, respectively.

The thickening agent used as a component of the treating agent of this invention is a finely divided, unreactive, inorganic solid having a high surface area, such as submicroscopic fumed silica. A commercially available fumed silica particularly useful in the practice of this invention is sold under the trademark "CAB-O-SIL" (see Bulletin 2325/666 of the Cabot Corporation, Boston, Massachusetts). Typical properties of commercially available fumed silica products are set in the following table:

| | |
|---|---|
| Surface area, m²/g (BET) | 200 to 400 |
| Particle size, micron | 0.007 to 0.012 |
| Specific gravity | 2.2 |
| Moisture content (105°C., %) | 1.5 to 5 |
| Ignition loss (1000°C, moisture-free basis, %) | 1 to 2.5 |
| Silica content (%) | 99.8 |

The treating agent of this invention can be prepared by adding the thickening agent to the fluorinated liquid and the mixture subjected to agitation or shear. The desired viscosity of the thickened fluorinated liquid will be primarily dependent upon the amount of thickening agent used and secondarily upon the degree or intensity of agitation or shear. The desired viscosity of the thickened fluorinated liquid will be that viscosity which will make the fluorinated liquid relatively immobile or relatively static on the surface of the liquid body of vapor-generating chemical so as to sufficiently reduce the rate of flow of the evolved vapors through the thickened fluorinated liquid. Generally this viscosity is at least 1000 centipoises to as much as 200,000 centipoises or more, as measured at 23°C. by a rotating viscometer, e.g. a Brookfield viscometer, the preferred viscosity being in the range of about 5,000 to 30,000 centipoises. High viscosity, e.g. up to 1,000,000 centipoises, may be used but the rate of formation of a continuous layer of the thickened fluorinated liquid may be undesirably slow at these higher viscosities. Generally in order to obtain the desired viscosity in the thickened fluorinated liquid, the amount of thickening agent will be in the range of 0.01 to 5 weight percent, preferably 0.02 to 2 weight percent, based on the weight of the fluorinated liquid component.

The density of the thickened fluorinated treating agent must be less than the density of the vapor-generating liquid chemical to be treated therewith. In those cases where the fluorinated liquid component used has a density greater than the vapor-generating liquid, it will be necessary to decrease the density of the thickened fluorinated agent. Such density modification can be achieved, for example, by adding to the thickened fluorinated liquid an amount of glass microbubbles or microballoons, having densities of 0.2 to 0.5, in an amount sufficient to provide the thickened fluorinated liquid with a density of no more than about 95% of the density of the vapor-generating chemical. Glass microbubbles useful for this purpose are described in U.S. Pat. Nos. 3,585,157 and 3,365,315; commercially available glass microbubbles are described in Bulletins GBIF-1(82.1)R, June 12, 1972 and L-GBPBC-2(110.2)R, Dec. 1, 1970 of the 3M Company, the SPE Journal, Vol. 25, No. 4, p. 83–87, April 1969.

The chemical liquids which are treated in the practice of this invention to control the evolution of noxious vapors therefrom are those chemicals which are normally liquid and volatile at ambient temperature. These chemicals will generally be inorganic and will be particularly those which form acidic vapors which react with water in an exothermic fashion, especially those which are reactive in an explosive or violent manner with water, such as liquid sulfur trioxide, oleum, sulfuryl chloride, sulfuryl bromide, phosphorous trichloride, phosphorous tribromide, phosphorous oxychloride, phosphorous oxybromide, silicon tetrachloride, dibromodichlorosilane, titanium tetrachloride, tin tetrachloride, antimony trichloride, bromine, and the like.

The mode of applying the treating liquid to the body of vapor-generating chemical can vary but such methods as spraying, pouring and the like generally can be used to apply the thickened fluorinated liquid. The body of chemical generally should be in a relatively static or contained condition and may be in the form of a pool, puddle, or spill in a pump, gutter, dike, moat, hollow, or depression. The amount of treating agent applied will be that sufficient to form a layer, e.g. 0.15 to 2.5 cm thick. Following the application of the thickened fluorinated liquid, the body of chemical can be disposed of in any suitable fashion, such as by pumping to an appropriate reservoir or container. One particularly useful method of disposal will be to convert the body of chemical into a stable aqueous solution which can be safely and readily handled. Such an aqueous solution can be obtained without hazard by controlled spraying of water, for example in the form of a mist on top of the layer of thickened fluorinated liquid, forming a thin layer of water on the top thereof which can safely absorb the noxious vapors as they are slowly emitted through the layer of thickened fluorinated liquid. The water can be sprayed in this fashion until the bulk of the chemical is safely diluted so that conventional neutralization and disposal methods can be readily used.

Objects and advantages of this invention are illustrated in the following examples but the particular materials and amounts thereof, and other details, recited in these examples should not be construed to unduly limit this invention.

EXAMPLE 1

Three grams of fumed silica ("CAB-O-SIL" M-5) was added to 100 g. of fluorinated liquid (a mixture of $C_8F_{18}$ and $c-C_8F_{16}O$, having a viscosity of about 1.7 centipoises), with stirring and then shaking, forming a pourable, uniform, thickened paste, having a viscosity of about 1000 centipoises as measured with a Brookfield viscometer at room temperature.

About 20 ml of liquid sulfur trioxide ("Sulfan" B) was placed in a 60 mm glass Petri dish, a dense, white, copious fume rising above the dish and filling the atmosphere around it. The above-described thickened fluorinated liquid paste was poured on the surface of the liquid sulfur trioxide, the paste spreading over and floating on the surface thereof and immediately suppressing the release of sulfur trioxide vapor (only a thin layer of white fume appeared, closely confined within the dish below the top of the rim). In a control dish run at the same time, a copious white fume continuously evolved over the dish. Even after standing for 15 to 20 minutes, the dish of liquid sulfur trioxide treated with the thickened fluorinated liquid emitted only the relatively thin layer of fume which hung closely to the surface of the thickened fluorinated liquid. Water was gently sprayed on the surface of the thickened fluorinated liquid, the water in the form of small puddles reacting without any vigorous action with the sulfur trioxide vapors slowly released from the layer of thickened fluorinated liquid. Similar results were obtained with a thickened fluorinated liquid prepared in a similar manner but containing 2 weight percent fumed silica. By contrast, when water was added in the same manner to the fume covered control dish of liquid sulfur trioxide, a violent, nearly explosive reaction ensued, splattering the contents of the dish.

By way of further comparison and in contrast with the results obtained as described above using thickened fluorinated liquid, when the fluorinated liquid was applied in an unthickened state to liquid sulfur trioxide, the sulfur trioxide vapor continued to pass through the layer of fluorinated liquid with only a slight decrease in the cloud of sulfur trioxide fume that hovered over the dish. And in a further run, when glass microbubbles (grade B-25-B, manufactured by the 3M Company) were added to the fluorinated liquid and the microbubble-fluorinated liquid mixture was applied to the liquid sulfur trioxide, the evolution of sulfur trioxide vapor appeared to be enhanced compared to the results obtained when the fluorinated liquid per se was applied.

EXAMPLE 2

Three thickened fluorinated liquid compositions were prepared and evaluated as described below.

The first thickened fluorinated liquid composition was made by adding 2 g of fumed silica ("CAB-O-SIL" M-5) to 100 g of fluorinated liquid ( $N(C_4F_9)_3$, having a viscosity of about 5 centipoises) and the mixture shaken to form a thickened fluorinated liquid having a viscosity of about 1200 centipoises. A second thickened fluorinated liquid was prepared in the same manner except that the fumed silica amounted to 3 weight percent of the composition and formed a loose paste (about 29,000 centipoises) which did not pour as readily as the first composition. The third thickened composition was prepared by shaking 1.5 g of the fumed silica with 1,000 g of the fluorinated liquid and then adding to the mixture 6 g of glass microbubbles (grade B-25-B) and the mixture shaken to form a thickened composition having the consistency of whipped cream.

Each of the above thickened compositions was poured onto the surface of a different body of liquid sulfur trioxide ("Sulfan" B) placed in a separate 60 mm diameter glass Petri dish. Each of the first and second thickened fluorinated liquids greatly diminished the formation of the cloud of dense white fume above the dish, similar to the result obtained in Example 1. The third thickened composition also diminished the formation of the white fume above the dish and through such suppression of the fume was not as fast as the case of the first and second thickened compositions, the suppression of the fume after 1 hour was somewhat better than that obtained with the first and second thickened compositions.

Various modifications and alterations of this invention will become apparent from the foregoing description and examples without departing from the scope or spirit of this invention.

I claim:

1. The method of suppressing the evolution of noxious acidic vapor from a body of volatile, inorganic, normally liquid chemical which reacts with water, which comprises applying to the exposed surface of said body an amount of a treating agent sufficient to form a layer thereof on the surface of said body, said treating agent consisting essentially of: a fluorinated aliphatic liquid which is inert and stable with respect to said chemical and vapor thereof, has a boiling point greater than about 55°C, and contains 60 to 76 weight percent carbon-bonded fluorine; and finely divided, non-reactive, inorganic solid thickening agent dispersed in said fluorinated aliphatic liquid in an amount sufficient to thicken the same and impart to it a viscosity sufficient to render said layer of treating agent relatively immobile on the surface of said body so as to reduce the rate of flow from said inorganic liquid of said acidic vapor evolved therefrom.

2. The method of claim 1 wherein said liquid chemical is liquid sulfur trioxide.

3. The method of claim 1 wherein said inorganic solid is fumed silica.

4. The method of claim 1 wherein said fluorinated aliphatic liquid is perfluorinated.

* * * * *

UNITED STATES PATENT OFFICE
CERTIFICATE OF CORRECTION

PATENT NO. : 3,950,494
DATED : April 13, 1976
INVENTOR(S) : Richard A. Guenthner It is certified that error appears in the above—identified patent and that said Letters Patent are hereby corrected as shown below:

Column 6, line 4, "through" should read -- though --.

Signed and Sealed this

Tenth Day of August 1976

[SEAL]

Attest:

RUTH C. MASON
Attesting Officer

C. MARSHALL DANN
Commissioner of Patents and Trademarks